(12) United States Patent
Hata et al.

(10) Patent No.: US 8,395,889 B2
(45) Date of Patent: Mar. 12, 2013

(54) COOLING UNIT AND ELECTRONIC DEVICE (75) Inventors: Yukihiko Hata, Hamura (JP); Shinji Hiratomo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 12/876,885

(22) Filed: Sep. 7, 2010

(65) Prior Publication Data
US 2011/0157826 A1 Jun. 30, 2011

(30) Foreign Application Priority Data
Dec. 25, 2009 (JP) ................................. 2009-296178

(51) Int. Cl.
*H05K 7/20* (2006.01)
*F28F 7/00* (2006.01)
*H01L 23/34* (2006.01)

(52) U.S. Cl. .................. 361/679.47; 361/697; 361/700; 361/679.49; 165/80.3; 165/80.5; 257/722; 174/15.2; 174/16.3

(58) Field of Classification Search ............ 361/679.47–679.48, 679.52, 679.54–679.55, 694–695, 361/697, 700, 703–704, 709; 454/184; 165/80.2–80.3, 104.33, 185; 174/15.2, 174/16.1, 16.3
See application file for complete search history.

(56) References Cited

U.S. PATENT DOCUMENTS

| | | | |
|---|---|---|---|
| 6,728,105 B2 | 4/2004 | Tanaka | |
| 6,772,883 B2* | 8/2004 | Lindamood | 206/320 |
| 7,336,489 B1* | 2/2008 | Chen et al. | 361/700 |
| 7,345,874 B2* | 3/2008 | Cheng et al. | 361/695 |
| 7,362,568 B2* | 4/2008 | Huang | 361/679.48 |
| 7,643,295 B2* | 1/2010 | Chao et al. | 361/700 |
| 7,649,736 B2* | 1/2010 | Hongo | 361/679.47 |
| 7,660,119 B2* | 2/2010 | Iikubo | 361/697 |
| 7,663,881 B2* | 2/2010 | Kuo | 361/692 |
| 7,715,193 B1* | 5/2010 | Ye et al. | 361/695 |
| 7,830,663 B2* | 11/2010 | Iikubo | 361/697 |
| 7,889,495 B2* | 2/2011 | Tachikawa | 361/679.48 |
| 7,903,418 B2* | 3/2011 | Tracy et al. | 361/714 |
| 7,907,405 B2* | 3/2011 | Tachikawa | 361/695 |

(Continued)

FOREIGN PATENT DOCUMENTS

| | | |
|---|---|---|
| JP | 05-261227 | 10/1993 |
| JP | 2003-264389 A1 | 9/2003 |

(Continued)

OTHER PUBLICATIONS

Notice of Rejection mailed by Japan Patent Office on Nov. 30, 2010 in the corresponding Japanese patent application No. 2009-296178.

(Continued)

*Primary Examiner* — Zachary M Pape
(74) *Attorney, Agent, or Firm* — Knobbe, Martens, Olson & Bear, LLP (57) ABSTRACT

According to one embodiment, a cooling unit includes a heat dissipating mechanism, a fan, and a movable cover. The heat dissipating mechanism is housed in a housing of an electronic device. The fan is housed in the housing, and generates an air flow that collides against the heat dissipating mechanism. The movable cover includes a sheet and a knob. The sheet serves as an openable and closable cover to cover an opening on a chamber formed between the fan and the heat dissipating mechanism from the outside. The knob is located on the sheet and protrudes outward.

8 Claims, 6 Drawing Sheets

U.S. PATENT DOCUMENTS

| | | | |
|---|---|---|---|
| 7,930,071 B2* | 4/2011 | Nishizawa et al. | 700/304 |
| 7,995,343 B2* | 8/2011 | Suzuki et al. | 361/699 |
| 8,016,927 B2* | 9/2011 | Tracy et al. | 96/420 |
| 2007/0131383 A1* | 6/2007 | Hattori et al. | 165/11.2 |
| 2008/0266796 A1 | 10/2008 | Iikubo | |
| 2010/0067195 A1* | 3/2010 | Tanaka | 361/692 |
| 2010/0073867 A1* | 3/2010 | Tachikawa | 361/679.48 |
| 2010/0079947 A1* | 4/2010 | Aoki | 361/695 |
| 2011/0075364 A1* | 3/2011 | Ma et al. | 361/697 |

FOREIGN PATENT DOCUMENTS

| | | |
|---|---|---|
| JP | 2007-189183 A1 | 7/2007 |
| JP | 2008-140055 | 6/2008 |
| JP | 2008-234346 A1 | 10/2008 |
| JP | 2009-064349 | 3/2009 |

OTHER PUBLICATIONS

Notice of Rejection mailed by Japan Patent Office on Feb. 15, 2011 in the corresponding Japanese patent application No. 2009-296178.

Notice of Rejection mailed by Japan Patent Office on May 24, 2011 in the corresponding Japanese patent application No. 2009-296178.

Concise explanations of the relevance, JP 05-261227, JP 2008-140055, JP 2009-064349.

* cited by examiner

COOLING UNIT AND ELECTRONIC DEVICE

CROSS-REFERENCE TO RELATED APPLICATIONS

This application is based upon and claims the benefit of priority from Japanese Patent Application No. 2009-296178, filed on Dec. 25, 2009, the entire contents of which are incorporated herein by reference.

FIELD

Embodiments described herein relate generally to a cooling unit and an electronic device.

BACKGROUND

For example, Japanese Patent Application Publication (KOKAI) No. 2009-64349 discloses a conventional electronic device comprising a heat dissipating fin housed in a housing and a cooling fan located spaced apart from the heat dissipating fin in the housing. Between the heat dissipating fin and the cooling fan is covered by an openable and closable film cover. The film cover is opened for the maintenance of the heat dissipating fin and the like.

In the conventional electronic device, the film cover may be hard to open depending on the layout of components around the film cover.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, a cooling unit comprises a heat dissipating mechanism, a fan, and a movable cover. The heat dissipating mechanism is housed in a housing of an electronic device. The fan is housed in the housing, and generates an air flow that collides against the heat dissipating mechanism. The movable cover comprises a sheet and a knob. The sheet is configured as an openable and closable cover to cover an opening on a chamber formed between the fan and the heat dissipating mechanism from the outside. The knob is located on the sheet and protrudes outward.

According to another embodiment, an electronic device comprises a housing and a cooling unit. The cooling unit comprises a heat dissipating mechanism, a fan, and a movable cover. The heat dissipating mechanism is housed in a housing of an electronic device. The fan is housed in the housing, and generates an air flow that collides against the heat dissipating mechanism. The movable cover comprises a sheet and a knob. The sheet is configured as an openable and closable cover to cover an opening on a chamber formed between the fan and the heat dissipating mechanism from the outside. The knob is located on the sheet and protrudes outward.

According to still another embodiment, an electronic device comprises a housing, a heat dissipater, a fan, a sealing member, and a protrusion. The housing comprises a wall provided with an opening. The cover is configured to cover the opening and be removably attached to the housing. The heat dissipater is housed in the housing. The fan is located spaced apart from the heat dissipater, and is configured to blow air toward the heat dissipater. The sealing member comprises a first end portion fixed in the housing and a second end portion located opposite the first end portion. The sealing member is configured to cover a gap between the heat dissipater and the fan. The protrusion is provided to the first end portion, and comprises a portion located outside the housing from the opening when the cover is removed from the housing.

Figure 1:
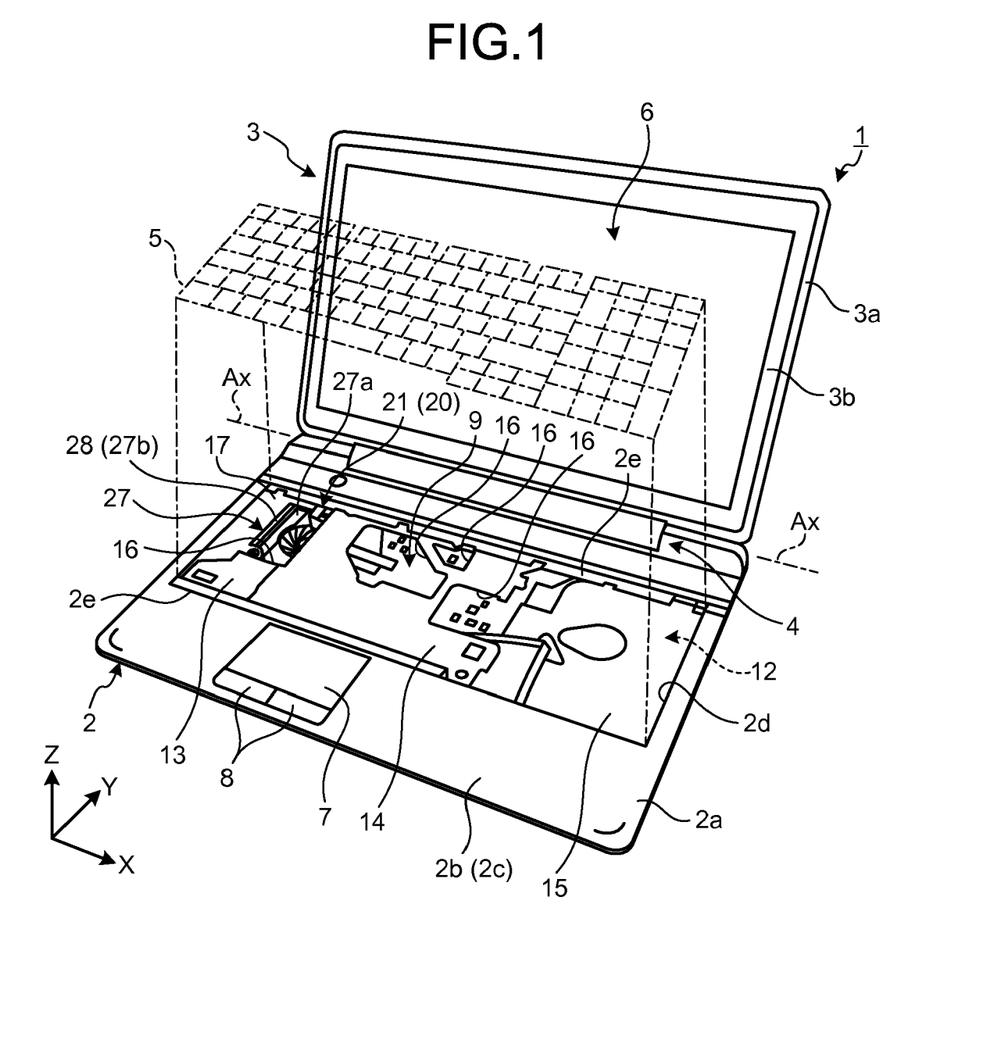
FIG. 1 is an exemplary exploded perspective view of an electronic device according to an embodiment.

As illustrated in FIG. 1, an electronic device 1 of an embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax between a closed position (not illustrated) and an open position (FIG. 1). Hereinafter, for the sake of convenience, based on the use condition of the electronic device 1, the width direction (horizontal direction) of the first body 2 will be referred to as "X direction", the depth direction of the first body 2 will be referred to as "Y direction", and the thickness direction of the first body 2 will be referred to as "Z direction". X, Y, and Z axes are perpendicular to one another.

The first body 2 is provided with a keyboard 5 as an input device, a pointing device 7, a click button 8, and the like, which are exposed on a front surface 2b as an outer surface of a housing 2a. On the other hand, the second body 3 is provided with a liquid crystal display (LCD) panel 6 as a display device, which is exposed on a front surface 3b as an outer surface of a housing 3a. When the first body 2 and the second body 3 are in the open position, the keyboard 5, the LCD panel 6, and the like are exposed to allow the user to use them. On the other hand, in the closed position, the front surface 2b closely faces the front surface 3b, and the keyboard 5, the LCD panel 6, the pointing device 7, the click button 8, and the like are covered between the housings 2a and 3a.

A rectangular opening 2d is formed on the back side of a top wall 2c in the depth direction (Y direction), i.e., on the side of the hinge mechanism 4). The top wall 2c forms the front surface 2b of the first body 2. The opening 2d occupies more than half of the front surface 2b. The opening 2d is long in the width direction (Y direction) and extends one end to the other in the width direction. The keyboard 5 (keyboard unit) serves as a cover that covers the opening 2d.

Figure 2:
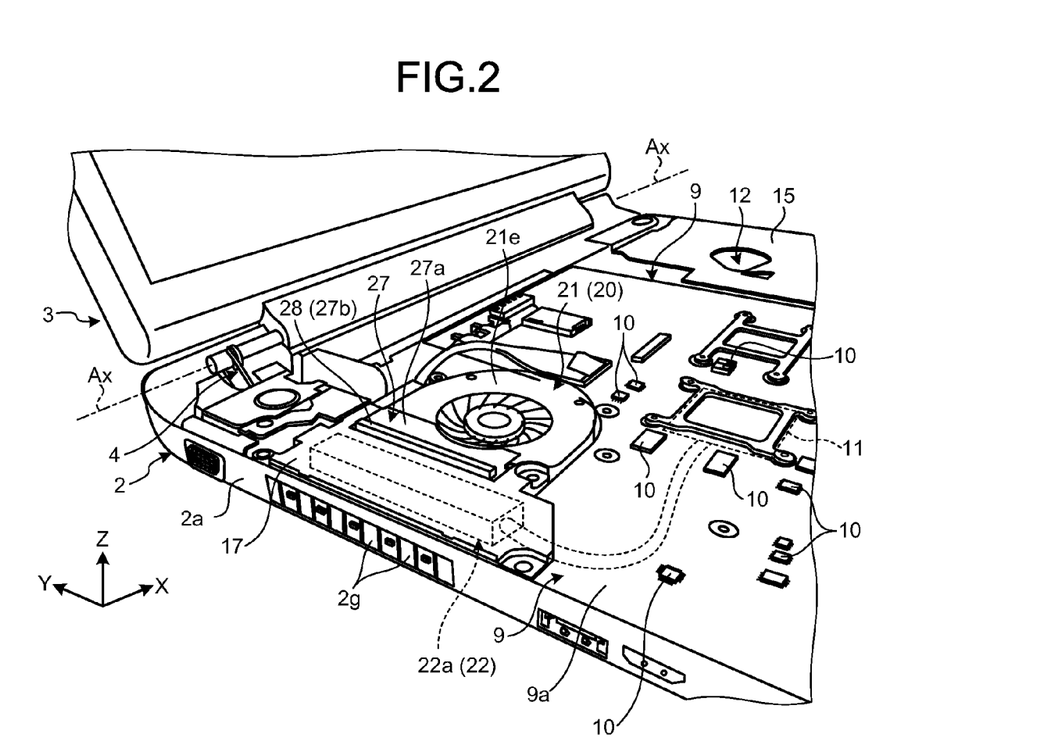
FIG. 2 is an exemplary perspective view of the inside of the housing of the electronic device in the embodiment.

As illustrated in FIG. 2, a circuit board 9 is housed in the housing 2a. A plurality of electronic components 10 are mounted on a front surface 9a and a back surface (not illustrated) of the circuit board 9. Among the electronic components 10, a device 11 is a heat generating element that is highly integrated and generates a relatively large amount of heat such as a chipset, a central processing unit (CPU), a multi-core CPU, and the like. A cooling unit 20 is provided for the device 11 mounted on the back surface of the circuit board 9.

In addition to the cooling unit 20, the housing 2a houses an optical disk drive (ODD) unit 12 and the like. In the embodiment, a fan 21 of the cooling unit 20 and a heat dissipating part 22a of a heat dissipating mechanism 22 are located on one side and the ODD unit 12 is located on the other side of the circuit board 9 in the width direction (X direction).

As illustrated in FIG. 1, the circuit board 9, the ODD unit 12, and the cooling unit 20 are covered with plates 13 and 14, and a sheet 15. That is, the plates 13 and 14, and the sheet 15 separate the circuit board 9, the ODD unit 12, and the cooling unit 20 on the bottom wall of the housing 2a of the first body 2 from the keyboard on the top wall 2c in between them. The plates 13 and 14, and the sheet 15 are locked or fixed to, for example, the top wall 2c or the bottom wall of the housing 2a with a fixing member such as a screw (not illustrated).

As illustrated in FIG. 1, an opening 16 is formed in part of the area covered by the plates 13 and 14. This allows, in the state where the keyboard 5 is removed as illustrated in FIG. 1, the user to access part of functional components and area through the opening 2d and the opening 16. The opening 16 may be formed by only the plate 14 or by a combination of the plates 13 and 14, and a block member 17. The plates 13 and 14, and the block member 17 also serve as walls.

The keyboard 5 (keyboard unit) is placed on a flange 2e formed around the periphery of the opening 2d or on the block member 17 as a placement board. A locking member that locks the keyboard 5 may be formed on the flange 2e. The keyboard 5 may also be fixed with a fixing member such as a screw.

Figure 3:
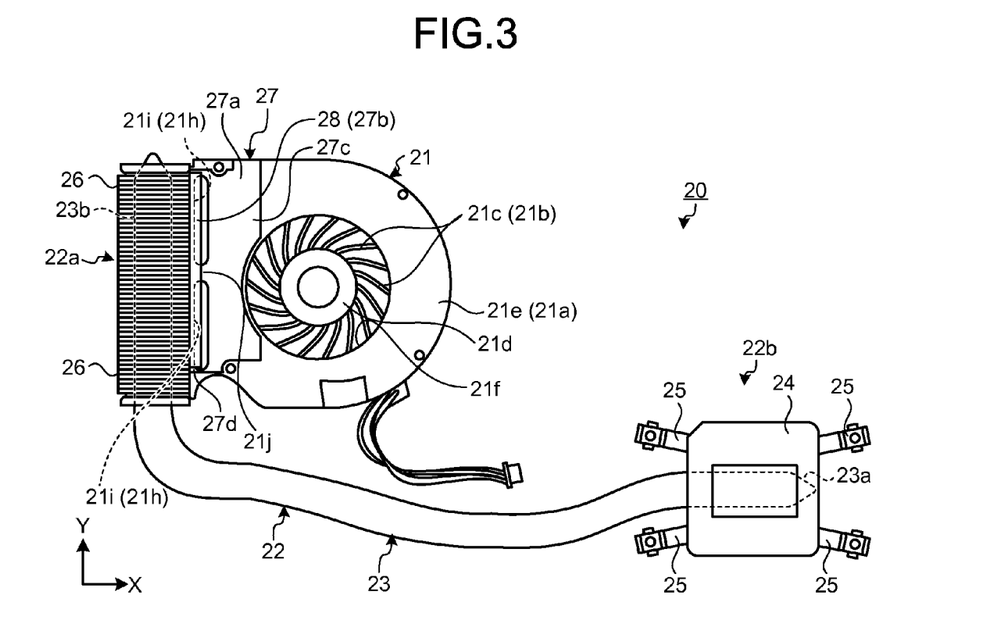
FIG. 3 is an exemplary plan view of a cooling unit installed in the electronic device in the embodiment.

In the state where the keyboard 5 is removed as illustrated in FIG. 1, part of the cooling unit 20 is exposed from the opening 16 on the leftmost back side in FIG. 1. As illustrated in FIG. 3, the heat dissipating mechanism 22 (at least the heat dissipating part 22a) and the fan 21 are integrated to form the cooling unit 20. The heat dissipating mechanism 22 of the embodiment comprises a heat pipe 23, a heat receiver 24, a pushing member 25, a plurality of fins 26, and the like.

The heat receiver 24 is in contact with a first end portion 23a of the heat pipe 23. The pushing member 25 pushes the heat pipe 23 and the heat receiver 24 against the device 11 on the circuit board 9. On the other hand, the fins 26 as heat dissipating members, which are layered along the heat pipe 23, are in contact with a second end portion 23b of the heat pipe 23.

The heat pipe 23 is provided therein with a refrigerant that evaporates when heated and condenses when cooled. The refrigerant located on the first end portion 23a side in the heat pipe 23 evaporates into a gas when heated by the heat generated by the device 11 via the heat receiver 24. The gas flows in the heat pipe 23 toward the second end portion 23b side. The refrigerant located on the second end portion 23b side in the heat pipe 23 condenses into liquid when cooled by the fins 26. The liquid refrigerant flows back to the first end portion 23a side in the heat pipe 23 by capillarity. In this manner, the refrigerant flows back and forth between the first end portion 23a and the second end portion 23b in the heat pipe 23 while repeatedly evaporating and condensing. Accordingly, the heat generated by the device 11 is transferred to the fins 26 as heat dissipating members via the heat receiver 24 and the heat pipe 23, and is dissipated from the fins 26 to the surrounding air. That is, according to the embodiment, a heat receiving part 22b of the heat dissipating mechanism 22 is formed of the first end portion 23a of the heat pipe 23, the heat receiver 24, the pushing member 25, and the like, while the heat dissipating part 22a of the heat dissipating mechanism 22 is formed of the second end portion 23b of the heat pipe 23, the fins 26, and the like.

Figure 4:
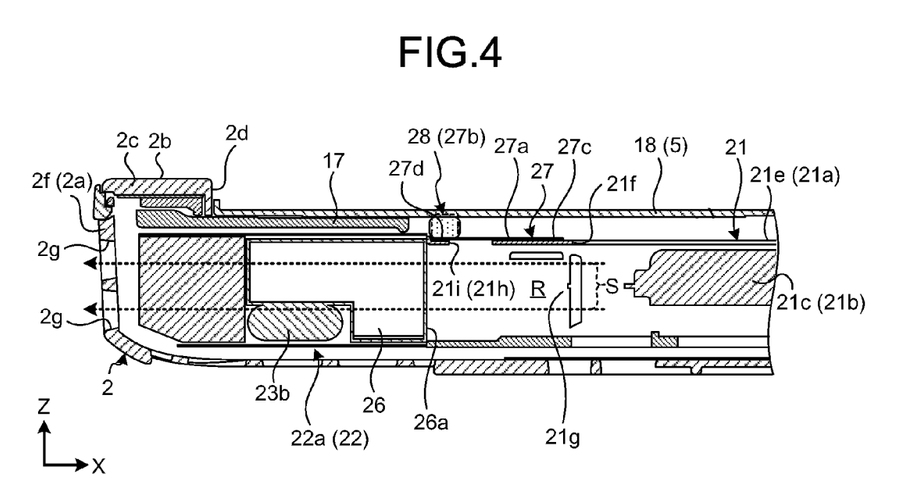
FIG. 4 is an exemplary cross-sectional view of the electronic device comprising the cooling unit in the embodiment.

Further, according to the embodiment, the fan 21 and the heat dissipating part 22a are integrated. As illustrated in FIGS. 3 and 4, the fan 21 comprises a case 21a, a rotor 21b, and an electric motor 21d. The rotor 21b is rotatably supported by the case 21a and is provided with a plurality of blades 21c. The electric motor 21d rotates the rotor 21b. The fan 21 is an electric fan. A circular opening 21f is formed as an air inlet on a plate 21e that forms the top wall of the case 21a. By the rotation of the rotor 21b and the blades 21c, the air sucked in through the opening 21f is blown out of an air outlet 21g (see FIG. 4). As illustrated in FIG. 4, an air flow S blown out of the air outlet 21g of the fan 21 passes through the heat dissipating part 22a and discharged from an exhaust port 2g. Accordingly, the air flow S generated by the fan 21 comes in contact with the heat dissipating part 22a, heated by the heat dissipating part 22a, and discharged from the exhaust port 2g. That is, the heat dissipating part 22a is cooled by the heat exchange with the air flow S.

As illustrated in FIG. 4, a chamber R is formed between the fan 21 and the heat dissipating part 22a of the cooling unit 20. An end portion 26a on the upstream of the fins 26 faces the chamber R. As illustrated in FIGS. 3 and 4, a plurality of slits 21h (in the embodiment, two slits) are formed, as openings facing the chamber R, on the plate 21e that forms at least part of the outer wall of the chamber R. In the embodiment, the slits 21h are each formed at a position adjacent to the boundary between the chamber R and the heat dissipating part 22a on the plate 21e that forms the top wall of the case 21a on the upper side. The slits 21h are formed elongated along the direction in which the second end portion 23b of the heat pipe 23 extends, i.e., the direction in which the fins 26 are layered (the vertical direction in FIG. 3). Besides, the slits 21h are arranged along the direction in which the fins 26 are layered. In the embodiment, the plate 21e serves as a wall.

Figure 5:
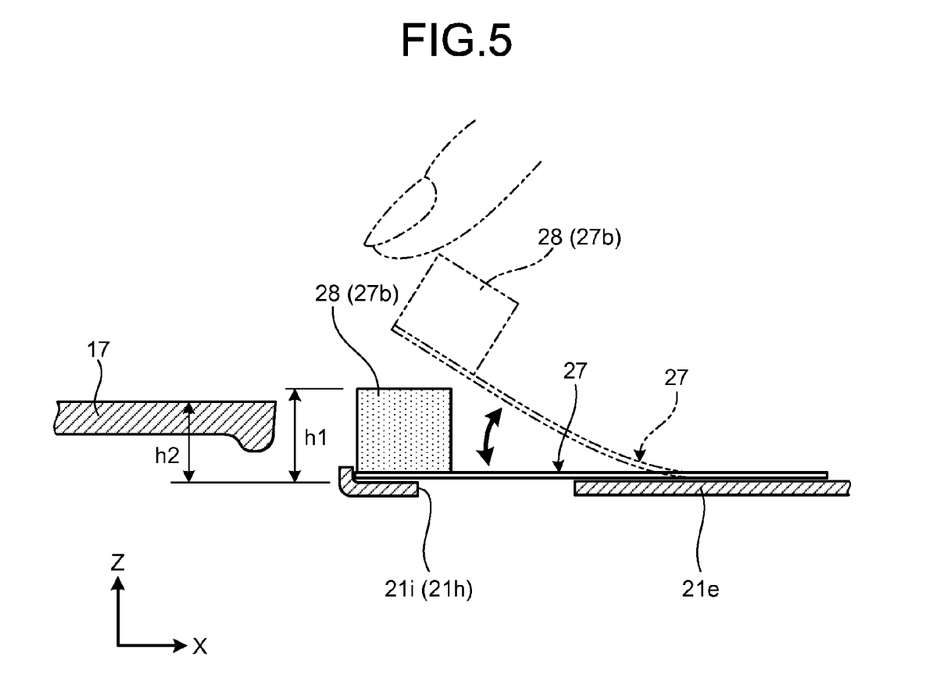
FIG. 5 is an exemplary enlarged view of part of the electronic device illustrated in FIG. 4 in the embodiment.

A movable cover 27 is attached to the outer surface of the plate 21e. The movable cover 27 comprises a sheet 27a that covers the slit 21h from the outside and a knob 27b that is provided to the sheet 27a and protrudes in the direction in which the slit 21h is open. The sheet 27a is formed into a reed shape extending along the longitudinal direction of the slit 21h. The sheet 27a includes a width-direction end portion 27c, as one end on the center side of the fan 21, that is attached to the outer surface of the plate 21e by an adhesive or the like so that the sheet 27a is fixed thereto. The sheet 27a further includes a width-direction end portion 27d as the other end on the heat dissipating part 22a side. The width-direction end portion 27d is a free end, and serves as an openable and closable cover that covers the slit 21h from the outside. That is, the sheet 27a is a flap plate valve. As illustrated in FIG. 5, the movable cover 27 is relatively easily bent in the direction separating from the outer surface of the plate 21e with a force applied in the upper direction (obliquely upward direction) by pulling up the knob 27b by a finger or the like. In this state, the user can do maintenance (cleaning of the fins 26, etc.) by inserting a stick-like tool through the opening 2d, the opening 16, and the slits 21h or the like. On the other hand, in the free state, the movable cover 27 is in close contact on the plate 21e by the elasticity of the sheet 27a to cover the slits 21h. That is, the sheet 27a of the embodiment serves as a sealing member.

The knob 27b is made of a flexible and elastic material such as elastomer and sponge, and is a formed as a handle 28 different from the sheet 27a. The handle 28 has a rectangle cross-section and is formed into a rectangular column shape elongated along the slit 21h. The handle 28 is attached to the sheet 27a by an adhesive or the like to be fixed thereto. The flexibility and elasticity of the handle 28 enables the movable cover 27 to be in highly close contact with the plate 21e, thereby improving the sealing properties.

As illustrated in FIGS. 3 and 4, the handle 28 is provided on the free end side of the sheet 27a. The handle 28 is located at a position on an edge 21i on one end side of the slit 21h in the width direction (in the embodiment, the heat dissipating part 22a side) while the movable cover 27 is closed. Further, when the movable cover 27 is closed, part of the handle 28 on the free end side of the sheet 27a is located on the plate 21e, while part of the knob 27b on the base side of the sheet 27a is located on the slit 21h. That is, the handle 28 is arranged across the edge 21i on one end side of the slit 21h in the width direction.

In the embodiment, as illustrated in FIG. 5, a block member 17 is located near the periphery of the slit 21h as a first member. A height h1 of the handle 28 (the knob 27b) from an edge of the slit 21h on the open side (i.e., from the outer surface of the plate 21e) is higher than a height h2 of the block member 17 from the edge of the slit 21h on the open side (i.e., from the outer surface of the plate 21e). This allows the user to easily access the knob 27b to open the movable cover 27 despite that the block member 17 protrudes relatively near the free end of the slit 21h. In the embodiment, the handle 28 (the knob 27b) is a protrusion.

Further, in the embodiment, as illustrated in FIG. 4, the handle 28 is elastically held between the plate 21e and a second member 18 (for example, the bottom wall of the keyboard 5) while the keyboard 5 is set and covers the opening 16 and the opening 2d. This enables the sheet 27a to be in close contact with the periphery of the slit 21h on the plate 21e with the handle 28, thereby improving the sealing properties of the closed movable cover 27.

Further, in the embodiment, as illustrated in FIG. 3, a bridge 21j is formed between the slits 21h arranged side by side. The bridge 21j prevents the edge of the sheet 27a on the free end side and the knob 27b from falling in the slits 21h and thereby prevents the degradation of the sealing properties.

As described above, according to the embodiment, the movable cover 27 comprises the sheet 27a and the knob 27b. The sheet 27a is an openable and closable cover that covers the slits 21h as an opening on the chamber R from the outside of the chamber R. The knob 27b is provided to the sheet 27a and protrudes outward. The user can easily open and close the movable cover 27 with the knob 27b.

According to the embodiment, the knob 27b comprises the handle 28 made of a different material from that of the sheet 27a. This facilitates to improve the function of the sheet 27a and the knob 27b.

According to the embodiment, the handle 28 is made of a flexible and elastic material. Accordingly, the movable cover 27 is easily bent compared to the case where the handle 28 is made of a hard material. Thus, the movable cover 27 can be easily opened and closed. Moreover, compared to the case where the handle 28 is made of a hard material, it is easier to reduce the stress acting on the sheet 27a when the movable cover 27 is opened and closed. This prevents the sheet 27a from being deformed and coming off.

According to the embodiment, the handle 28 is arranged along the longitudinal direction of the slit 21h as an opening. Accordingly, the handle 28 functions as a reinforcing member for the sheet 27a and prevents the sheet 27a from turning while the movable cover 27 is closed.

According to the embodiment, part of the handle 28 is located above the slit 21h while the movable cover 27 is closed. Accordingly, the handle 28 pushes the sheet 27a against the opening periphery (edge) of the slit 21h, thereby improving the sealing properties.

According to the embodiment, the plurality of slits 21h are arranged along the direction in which the fins 26 are layered, and the bridge 21j is formed between the slits 21h. The bridge 21j prevents the handle 28 from falling in the slits 21h.

According to the embodiment, the height h1 of the handle (the knob 27b) from the edge of the slit 21h on the open side (i.e., from the outer surface of the plate 21e) is higher than the height h2 of the block member 17 from the edge of the slit 21h on the open side (i.e., from the outer surface of the plate 21e). Accordingly, if the block member 17, as the first member that is higher than the edge of the slit 21h on the open side, is located at least at part of the periphery of the slit 21h outside the plate 21e in the housing 2a, the block member 17 does not make it difficult to open the movable cover 27.

According to the embodiment, the second member 18 is located above the slit 21h, and the handle 28 is elastically held between the second member 18 and the plate 21e as a peripheral member of the slit 21h. This enables the sheet 27a to be in close contact with the periphery of the slit 21h on the plate 21e with the handle 28, thereby improving the sealing properties of the closed movable cover 27.

Figure 6:
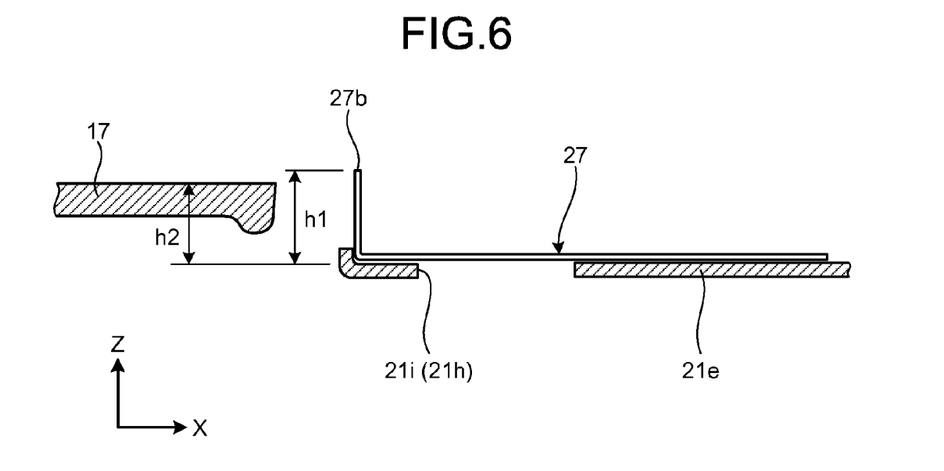
FIGS. 6 and 7 are exemplary schematic views of a movable cover in the embodiment.
Figure 7:
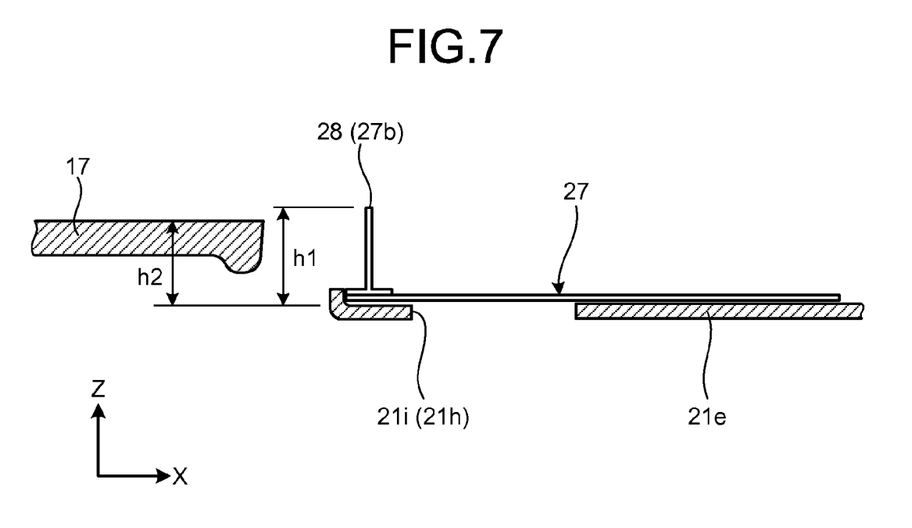

While the electronic device 1 of the embodiment is described above by way of example as a notebook personal computer, it may be any other electronic device than a notebook personal computer. Besides, the place and posture of the cooling unit 20 in the housing need not necessarily be as illustrated herein. The knob may be formed as part of the sheet by, for example, raising at least part of the free end of the sheet as illustrated in FIG. 6. Further, the shape of the handle may be changed as required and, for example, the handle may be formed in an inverted T-shape as illustrated in FIG. 7. The free end of the sheet may be extended so that a part except where a member (for example, the block member, etc.) is placed can be formed as the knob. The specification (location, size, shape, number, material, direction, etc.) can be changed as required for the heat dissipating mechanism, the fan, the chamber, the walls, the openings, the sheet, the knob, the movable cover, the handle, the first member, the second member, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a cooling unit comprising:
      a casing having a casing opening;
      a heat dissipating mechanism housed in the casing;
      a fan housed in the casing, the fan configured to generate an air flow that collides against the heat dissipating mechanism; and
      a chamber located in the casing and the chamber located between the fan and the heat dissipating mechanism,
         wherein the casing opening is directly above the chamber between the fan and the heat dissipating mechanism; and a movable cover comprising:
- an elastic sheet configured as an openable and closable cover to cover the casing opening, the movable cover being on an outside of the casing; and
- a knob located on the elastic sheet and protruding away from the casing, and
- wherein one end of the elastic sheet is fixed to an outside of the casing, another end of the elastic sheet is configured to be bent in a direction away from the casing to uncover the casing opening to provide access to the chamber located between the fan and the heat dissipating mechanism.

2. The electronic device of claim 1, wherein the knob is made of a different material from the elastic sheet.

3. The electronic device of claim 2, wherein the different material is a flexible material.

4. The electronic device of claim 2, wherein the different material is an elastic material.

5. The electronic device of claim 2, wherein the heat dissipating mechanism comprises a heat pipe, and a plurality of fins layered along the heat pipe, the casing comprising a casing wall, the casing wall having the casing opening, the casing opening extending along a direction in which the plurality of fins are layered,
wherein a length of the knob is arranged along the direction in which the plurality of fins are layered.

6. The electronic device of claim 5, wherein a part of the knob is located above the casing opening when the casing opening is covered with the elastic sheet.

7. The electronic device of claim 5, wherein the casing opening includes a plurality of casing openings arranged along the direction in which the plurality of fins are layered.

8. The electronic device of claim 5, further comprising
- a housing having a housing wall, the housing wall having a housing opening, the cooling unit housed in the housing;
- a removable cover covering the housing opening, the removable cover being on an outside of the housing,
- wherein the knob is elastically held through the housing opening between the casing wall and the removable cover.

* * * * *